July 24, 1928.
C. E. MORRIS
1,678,228
CIRCUIT CLOSING DEVICE
Filed May 20, 1926  3 Sheets-Sheet 1
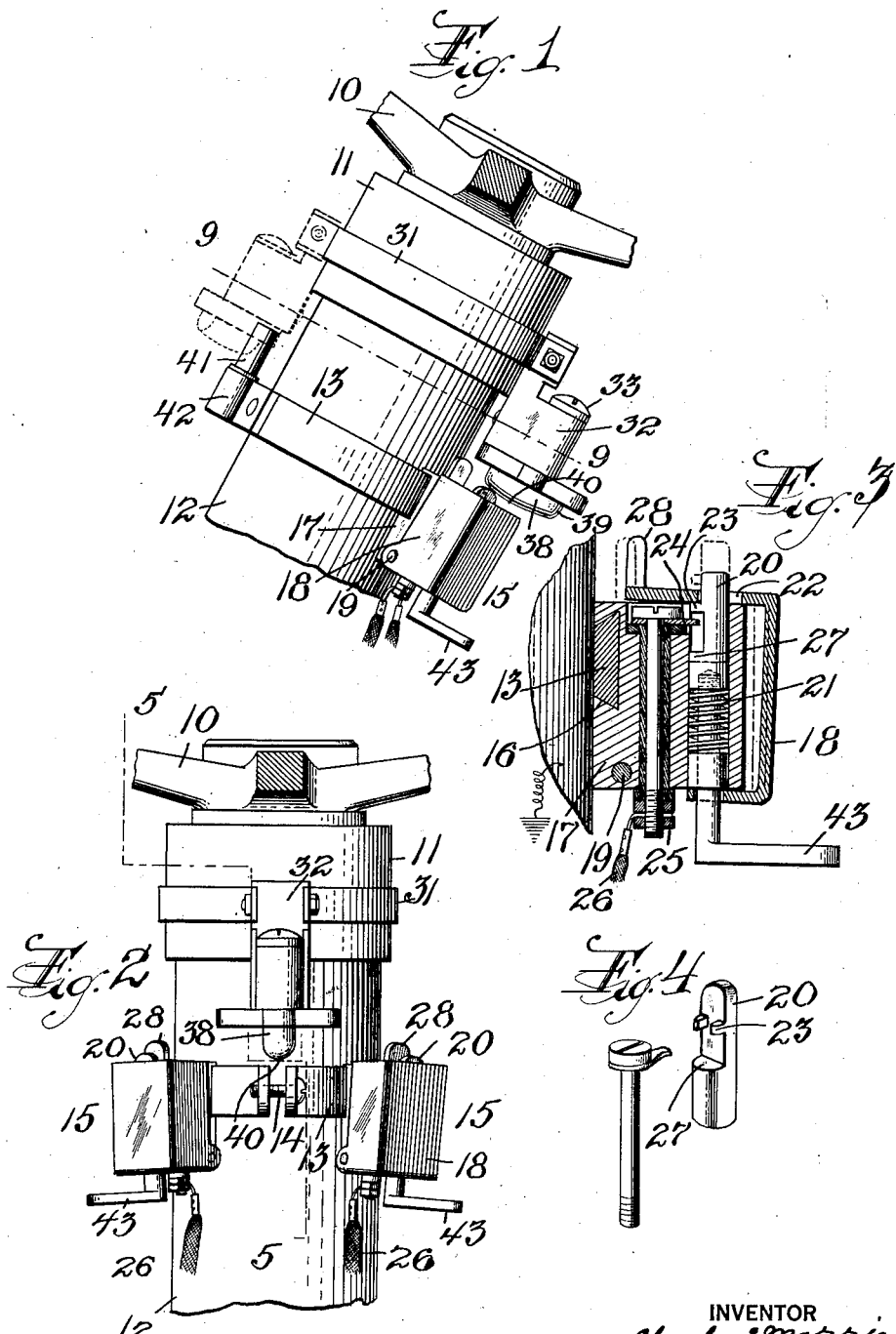
INVENTOR
Charles E. Morris,
BY
Wm. H. Canfield,
ATTORNEY July 24, 1928.
C. E. MORRIS
1,678,228
CIRCUIT CLOSING DEVICE
Filed May 20, 1926
3 Sheets-Sheet 2
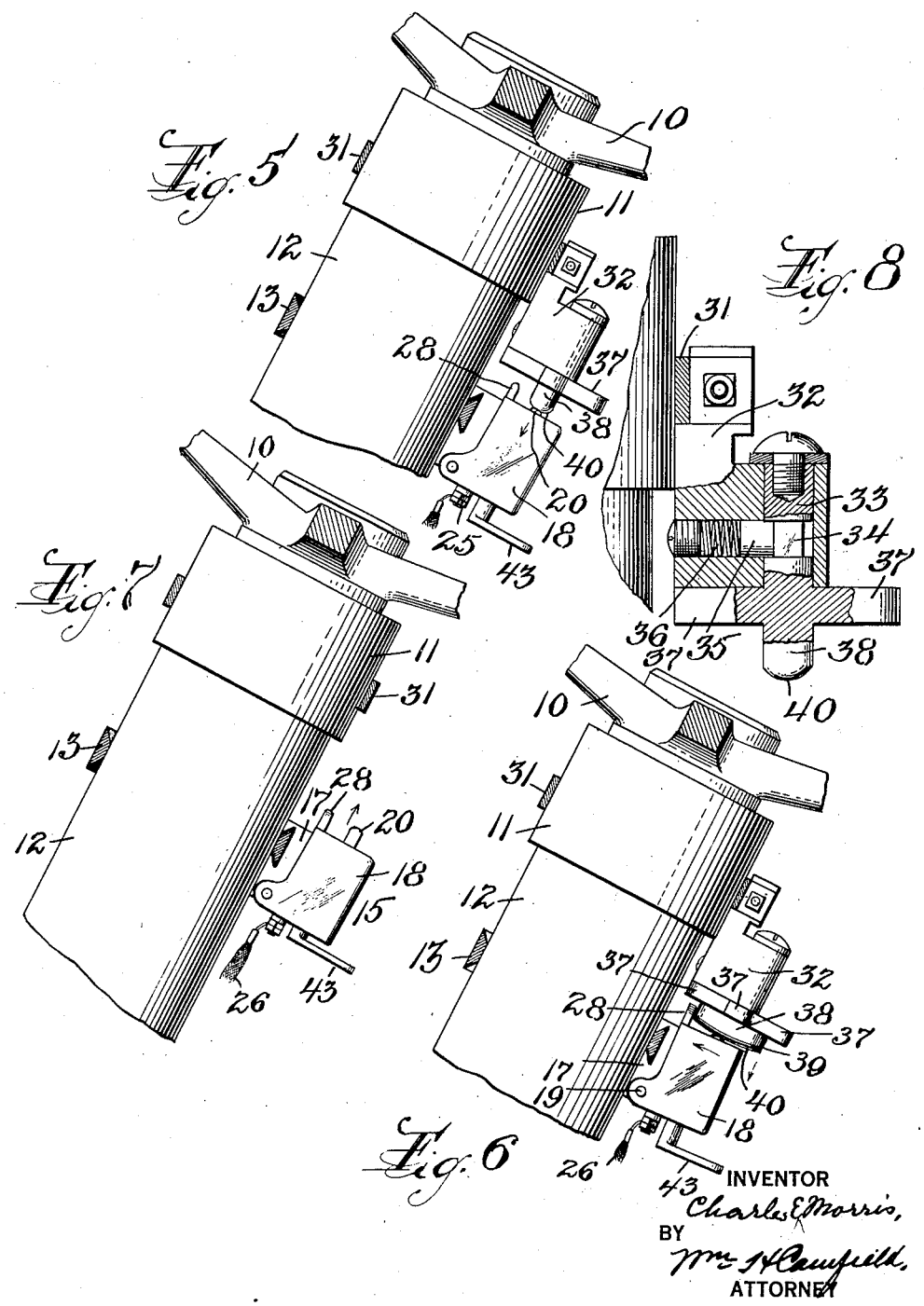

July 24, 1928.
C. E. MORRIS
1,678,228
CIRCUIT CLOSING DEVICE
Filed May 20, 1926     3 Sheets-Sheet 3
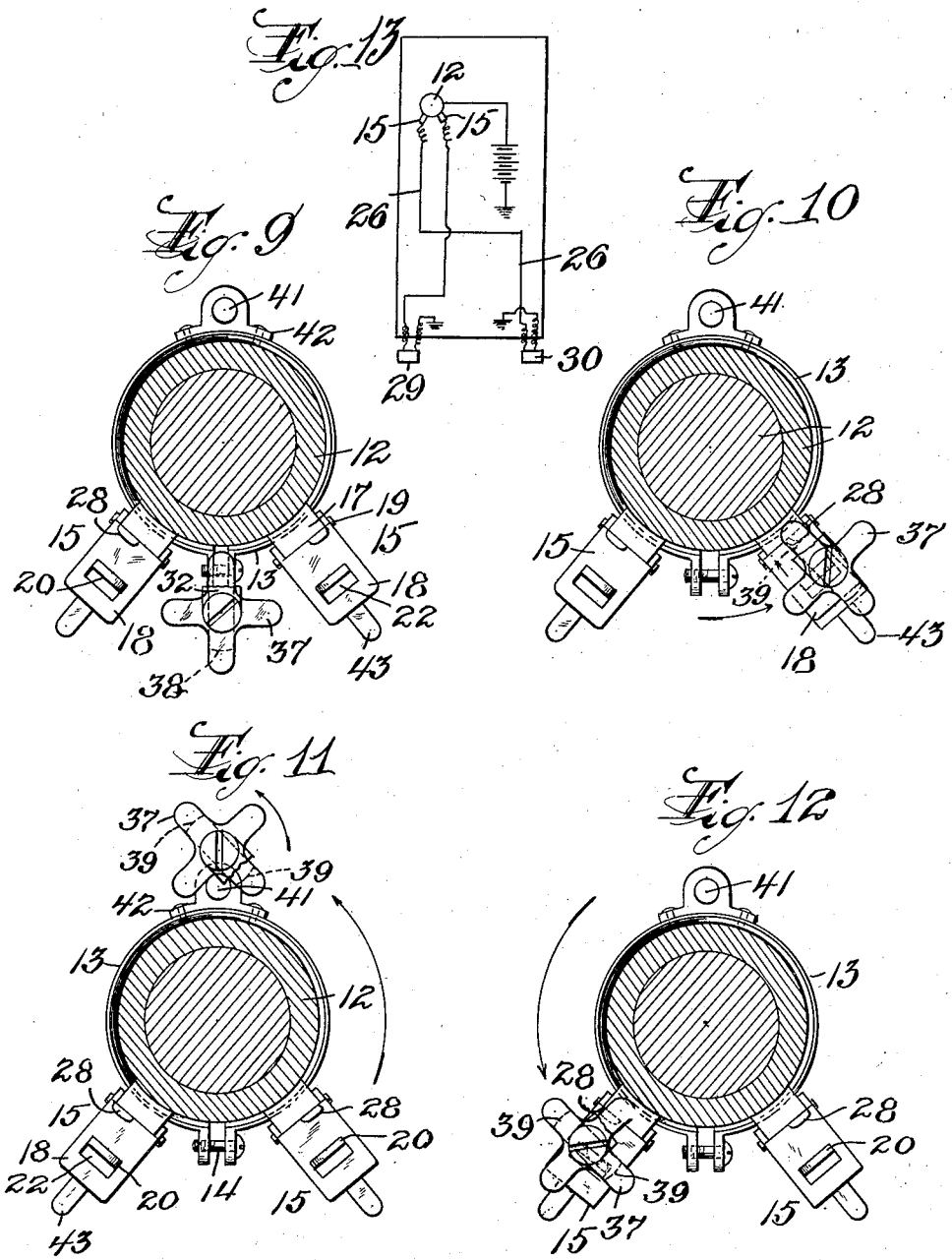
INVENTOR
Charles E. Morris
BY
Wm H Canfield
ATTORNEY Patented July 24, 1928.

1,678,228

UNITED STATES PATENT OFFICE.

CHARLES E. MORRIS, OF NEWARK, NEW JERSEY.

CIRCUIT-CLOSING DEVICE.

Application filed May 20, 1926. Serial No. 110,333.

This invention relates to an improved signal that can be adapted to various uses and applied to many different situations but in order to make a description clear and to indicate its preferred use, this specification is limited in its application to the operation of signal lights on an automobile. These lights are placed at the rear of the automobile and when lit indicate that the driver is initiating a change in direction of the travel of the vehicle.

The invention relates to the switches and operating mechanism, therefore, the switches being opened and closed by a device that swings in a circular path and is turned by the steering wheel.

In the operation of the invention at least two switches are used, one of these being closed when the steering wheel is turned and it remains closed even though the steering wheel is turned a complete revolution or more.

The invention includes a mechanism that makes the actuating means inoperative until it returns to the switch first closed: In other words, when a light is lighted to indicate a change in direction it remains lighted and the other light remains out until the steering wheel is turned back to its normal position when guiding the car straight ahead or nearly so.

The invention also resides in certain details of construction that are more fully described hereinafter and which are finally embodied in the clauses of the claims.

The invention is illustrated in the accompanying drawings in which Figure 1 is a side view of the invention mounted on a fragmentary showing of the steering wheel and the steering post. Figure 2 is a face view of the construction shown in Figure 1. Figure 3 is a vertical central section through one of the switches and Figure 4 is a view of the contact member of the switch. Figure 5 is a section taken through line 5—5 in Figure 2 but showing the post and steering wheel in elevation, this view showing the actuating mechanism operating on the switch to open it. Figure 6 is a similar view showing the operation of the actuating means to close the switch. Figure 7 is a similar view of the operating means and the switch closed. Figure 8 is an enlarged vertical section through the actuating means. Figure 9 is a section taken on line 9—9 in Figure 1 of steering wheel in normal position, normal position meaning its central position when the car is traveling straight. Figures 10, 11, and 12 are similar views with the actuating means in various positions in its circular path of travel. Figure 13 is a diagrammatic view of the current used in the lighting of the lights.

The drawings illustrate a steering wheel 10 which has a collar 11 which collar rotates with the steering wheel. This mechanism is supported on the fixed steering post 12.

I prefer to fasten the switches by suitable means and I show in the drawing a band 13 with its ends held together by a screw 14 to tightly clamp the band to the steering post, the band supporting the switches 15, the switches being preferably adjustable. To provide for this adjustment, I illustrate the band 13 as being bevelled inwardly at the top and bottom as will be seen from Figure 3 and the switch body has a dove-tailed recess 16, thus fastening the switches in adjusted position when the band is clamped on the steering post but being free for adjustment when the tension on the band is released.

The switch I have illustrated comprises the fixed base 17 to which is pivoted the shell or case 18, the shell being supported by the pivoted pin 19. The shell also acts as a means for releasing and also for locking the movable contact pin 20. The pin 20 is normally pressed upwardly by the spring 21 and slides in the base 17. The shell 18 has, in its top, an opening 22 one edge of which forms a lip to engage the top face of the shoulder 23 of the pin and hold it down. This is the normal position of the switch when it is open and is illustrated in Figure 3. The contact 24 is insulated from the rest of the switch and is connected at its bottom, as at 25 with one of the wires 26 of the circuit to be hereinafter described. When the switch is closed the shoulder 27 of the contact 20 engages the contact 24, this being the case when the shell 18 is swung back on its pivot to release the shoulder 23, and the projection 28 provides a means for engagement to so close the switch. When the post of contact 20 is pushed down from closed to open position it is automatically locked by the engagement of the edge of the opening 22 with the shoulder 23.

I usually place two switches 15 in proper position and these are connected by proper wires to the two rear lights 29 and 30 and it will be evident that the switches can be grounded through the post 12 to the battery circuit and the contacts 24 each to a wire 26 to the lights which are also grounded and the respective circuits are then energized when desired.

The actuating means for closing and opening the switches is shown, as secured by a strap 31 to the collar 11 of the steering wheel. The said means is normally between the two switches 15 and when swung to either side it is designed to close the switch that it engages.

We will assume for illustration that the car is to be steered sharply to the left and Figures 9 to 12 show the successive positions and functions of the various parts in a complete or nearly complete revolution of the steering wheel and how the apparatus fails to operate any switch after the first, to change its status until the actuating means returns to the switch that it first engaged.

On the strap 31 I arrange a bracket 32 in which is a rotatable stud 33 (see Figure 8) which stud has a square portion with flat faces 34 engaged by a piece 35 which has a flat face and is yieldingly held in place by a spring 36. This holds the stud 33 in four rotative positions. On the bottom of the stud is a star wheel formed with arms 37 and a switch actuating means or cam 38 which is long and narrow. This is seen from the edge view of it in Figure 2 and the side view of it in Figures 1 and 6. The ends 39 of the cam are for engagement with the faces of the projections 28 on the switches and the under face 40 of the cam is for engagement with top ends of the contacts or rods 20 so that the ends 39 of the cam faces are for opening the switches and the faces 40 for closing them.

The star wheel is turned by a suitably disposed post 41 which is shown at a point in the circular path of the actuating means opposite that of the normal position of said means, that is, if the cam and star wheel are in rear of the steering post when the car is going straight ahead, the post 41 is in front of the steering post. It is fixed by attaching it by a suitable bracket 42 to the band 13.

When the device is operated, and assuming that the steering wheel is turned to the left the actuating means is swung to the right as in Figure 10 and the edge 39 of the cam engages the projection 28 of switch 15 to the right. This allows the contact post 20 to rise and the shoulder 27 and the contact 24 are in contact and the proper light 29 at the rear is lit. It will be noticed from Figures 9 to 12 that the projection 28 is not in line radially with the post 20 so that the post 20 can begin to ascend before the cam leaves the projection 28.

The post 20 is held up in its contact position to close the switch by the spring 21 and the shell 18 is in turn held in its innermost position by the post 20. As the steering continues to the left it carries the actuating means with it and in time the star wheel engages the pin 41 as in Figure 11 and is turned a quarter revolution. This turns the cam so that it is lengthwise with its path of travel and ends 39 are not in position to engage the projections 28. As will be seen from Figure 12 this avoids any closing of the switch 15 at the left and the other light is not lit even though the actuating means makes more than a complete revolution which is often the case when turning a car for a complete change of direction.

When the steering wheel is turned back to the right the star wheel engages the pin 41 and the cam is once more disposed so that the end 39 is in position to engage the projection 28 of a switch in open position. Thus the cam passes by the projection 28 and then presses down on the top end of the contact post 20 which is preferably rounded. The post 20 is pressed down far enough to cause its shoulder 23 to be pushed below the edge of the hole 22 and the switch is opened and its light 29 is out.

It will be understood that the same sequence of operations takes place in the reverse direction when the steering wheel is turned to the right.

The contact post 20 has on its lower end a projecting part which forms a handle 43 so that if for any reason the driver of the car wishes to open the switch that is closed he simply pushes down on the handle of that particular switch.

I claim:

1. A circuit closing device comprising a set of switches, an actuating means for the switches, and a trip to make the actuating means inoperative after it passes the first switch that it actuates and resets it on its return toward said first switch.

2. A circuit closing device comprising a pair of switches, an actuating means normally between the switches and adapted to engage either of them to close and open them, and means to make it operative only on the switch first engaged.

3. A circuit closing device comprising a pair of switches, a rotatable actuating means for closing and opening the switches, said means being normally between the switches, and a trip between the switches on the side opposed to the normal position of the actuating means, said trip acting to make the said means inoperative except on the switch first closed.

4. A circuit closing device comprising a pair of switches, each switch including a projection for opening the switch and a projection for closing the switch, a cam movable to actuate the switches, and means for setting the cam so that it is inoperative for closing a switch after it has engaged one to close it until said switch is again opened.

5. A circuit closing device comprising a pair of switches, a support, an actuating cam movable in a circular path on the support and normally between them, the switches including projections to be engaged by the cam to open and close them, a star wheel on the cam, and a pin to engage the wheel to turn the cam out of opening position on its travel beyond and between the switches and to turn it to opening position on its return movement.

6. A circuit closing device comprising a pair of switches each switch including a laterally operated projection for opening it and a vertically operated projection for closing it, a support, a cam normally between the switches and movable in a circular path on the support, said cam having faces to move the projection on the switches and a trip for moving the cam to swing the laterally operative face inoperative, said trip being situated between the switches on the side opposite the normal position of the cam.

In testimony whereof I affix my signature.

CHARLES E. MORRIS.